United States Patent [19]

Ross

[11] Patent Number: 5,143,874
[45] Date of Patent: Sep. 1, 1992

[54] CATALYST REGENETATION IN HIGH EFFICIENCY REGENERATOR HEATED BY INDIRECT HEAT EXCHANGE

[75] Inventor: Mark S. Ross, Lawrenceville, N.J.

[73] Assignee: Mobil Oil Corporation, Fairfax, Va.

[21] Appl. No.: 657,781

[22] Filed: Feb. 19, 1991

Related U.S. Application Data

[63] Continuation-in-part of Ser. No. 464,068, Jan. 12, 1990, abandoned.

[51] Int. Cl.⁵ .................. B01J 38/36; B01J 21/20; C10G 11/18; F27B 15/08
[52] U.S. Cl. .................... 502/42; 34/57 A; 208/113; 208/164; 422/144; 502/43; 502/44
[58] Field of Search .................. 502/41–43; 208/113, 164

[56] References Cited

U.S. PATENT DOCUMENTS

| | | | |
|---|---|---|---|
| 2,401,739 | 6/1946 | Johnson | 252/242 |
| 3,919,115 | 11/1975 | Stine et al. | 252/417 |
| 3,923,686 | 12/1975 | Stine et al. | 252/417 |
| 3,926,778 | 12/1975 | Owen et al. | 208/74 |
| 4,368,114 | 1/1983 | Chester et al. | 208/120 |
| 4,784,748 | 11/1988 | Avidan et al. | 208/113 |
| 5,032,251 | 7/1991 | Owen et al. | 208/113 |
| 5,047,140 | 9/1991 | Owen et al. | 208/113 |

Primary Examiner—Paul E. Konopka
Attorney, Agent, or Firm—Alexander J. McKillop; Charles J. Speciale; Richard D. Stone

[57] ABSTRACT

A process and apparatus for high efficiency regeneration of spent FCC catalyst in an existing, single dense bed FCC regenerator is disclosed. Spent catalyst is added to a coke combustor immersed within the existing regenerator vessel catalyst bed. A dilute phase transport riser, above and connective with the coke combustor discharges a mixture of regenerated catalyst and flue gas. Regenerated catalyst collects around and under the coke combustor. The spent catalyst inlet, and combustion air inlet, are preferably immersed in, and in a heat exchange relationship with, the bed of hot regenerated catalyst. Heat pipes, or fins may be used to increase heat transfer into the coke combustor from the dense bed. Heating the coke combustor by indirect heat exchange, rather than recycle of hot regenerated catalyst, reduces particulates emissions and saves the energy needed to recycle catalyst in the regenerator.

8 Claims, 1 Drawing Sheet

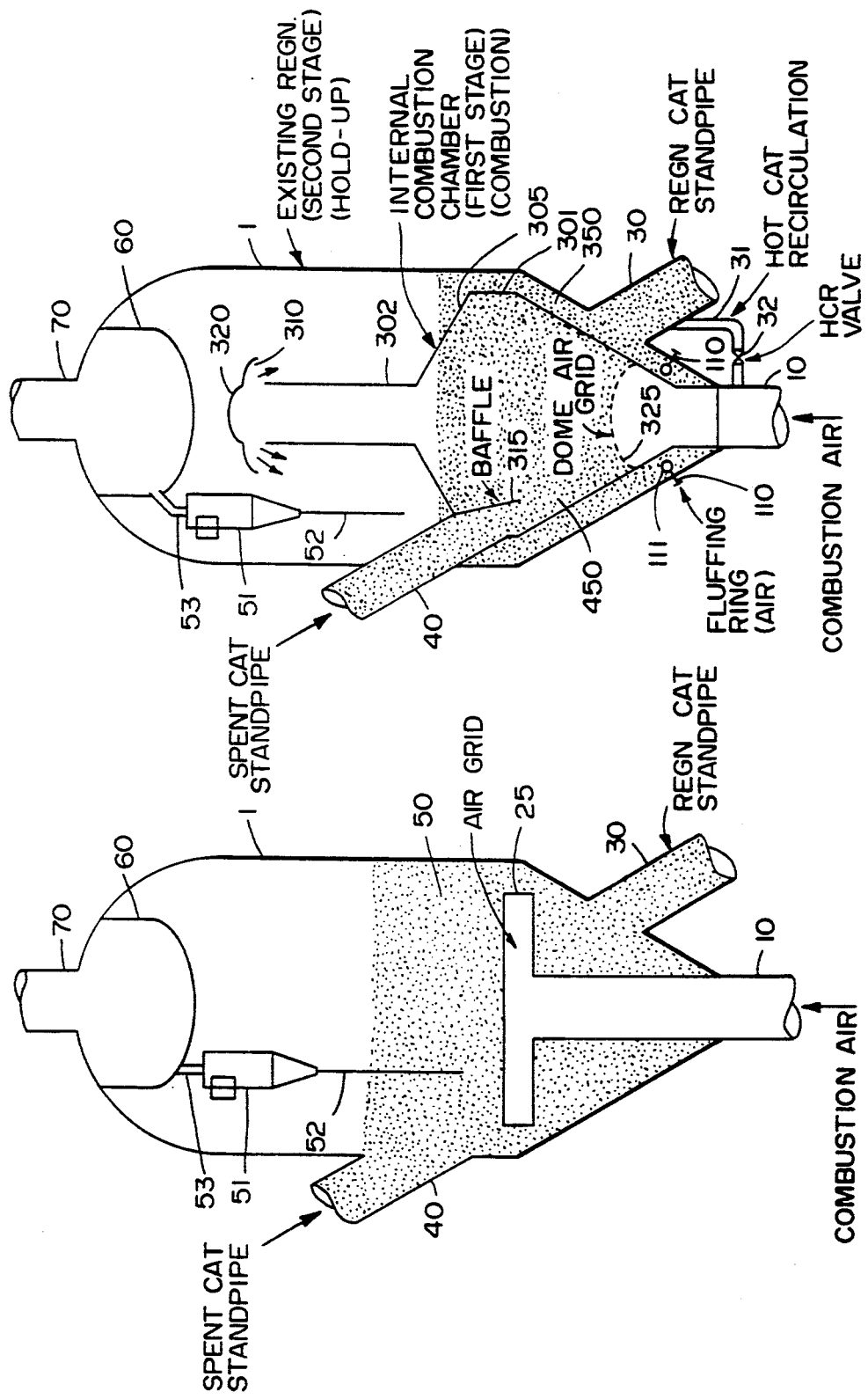

CATALYST REGENETATION IN HIGH EFFICIENCY REGENERATOR HEATED BY INDIRECT HEAT EXCHANGE

CROSS REFERENCE TO RELATED APPLICATIONS

This application is a continuation-in-part of copending application Ser. No. 464,068, filed Jan. 12, 1990, now abandoned, which is relied upon and incorporated herein by reference.

BACKGROUND OF THE INVENTION

1. Field of the Invention

The invention relates to the regeneration of fluidized catalytic cracking catalyst.

2. Description of Related Art

Catalytic cracking of hydrocarbons is carried out in the absence of externally supplied H2, in contrast to hydrocracking, in which H2 is added during the cracking step. An inventory of particulate catalyst is continuously cycled between a cracking reactor and a catalyst regenerator. In the fluidized catalytic cracking (FCC) process, hydrocarbon feed contacts catalyst in a reactor at 425 C–600 C, usually 460 C–560 C. The hydrocarbons crack, and deposit carbonaceous hydrocarbons or coke on the catalyst. The cracked products are separated from the coked catalyst. The coked catalyst is stripped of volatiles, usually with steam, and is then regenerated. In the catalyst regenerator, the coke is burned from the catalyst with oxygen containing gas, usually air. Coke burns off, restoring catalyst activity and simultaneously heating the catalyst to, e.g., 500 C–900 C, usually 600 C–750 C. Flue gas formed by burning coke in the regenerator may be treated for removal of particulates and for conversion of carbon monoxide, after which the flue gas is normally discharged into the atmosphere.

Most older FCC units regenerate the spent catalyst in a single dense phase fluidized bed of catalyst. Although there are myriad individual variations, typical designs are shown in U.S. Pat. No. 3,849,291 (Owen) and U.S. Pat. No. 3,894,934 (Owen et al), and U.S. Pat. No. 4,368,114 (Chester et at.) which are incorporated herein by reference.

Most new units are of the High Efficiency Regenerator (H.E.R.) design using a coke combustor, a dilute phase transport riser, and a second dense bed, with recycle of some hot, regenerated catalyst from the second dense bed to the coke combustor. Units like this are shown in U.S. Pat. No. 3,926,778 (which is incorporated by reference) and many recent patents. The H.E.R. design is used in most new units because it permits operation of an FCC with less catalyst inventor (and less catalyst loss), and because such units tend to have both less CO emissions and less NOx emissions than the single dense bed regenerators.

Unfortunately, it has not been economically justifiable to convert older style, single dense bed regenerators to the modern H.E.R. design because of the high capital cost associated with simple scrapping the old single bed regenerator. Attempts to simply use the old single stage regenerator as part of a modern two stage, H.E.R. design have not been too successful, as the old single stage units are much larger than either of the beds in an H.E.R. unit. Another complication has been that many of the older units were not designed to operate at the higher temperatures associated with complete CO combustion.

Rather than scrap older FCC regenerators, refiners have tried to improve them. Several regenerator designs have been proposed which could perhaps use some existing equipment, and which provide a fast fluidized bed coke combustor operating largely or entirely within a bubbling fluidized bed.

Gross U.S. Pat. No. 4,118,338, which is incorporated herein by reference, teaches a coke combustor vessel immersed in a bubbling dense bed. The coke combustor has an inverted cone section at the base, for admission of spent catalyst and for relatively large amounts of recycled regenerated catalyst. The coke combustor is suspended in the bubbling dense bed, and relies on fluid dynamics to circulate regenerated catalyst from the bubbling dense bed back into the base of the coke combustor, along with spent catalyst. The driving force presumably is the difference in densities—the density of the catalyst in the bubbling dense bed is usually roughly double that of the somewhat dense phase of catalyst in the coke combustor. Recycled to spent catalyst ratios of "from a small fraction (<0.5) to a high multiple of the catalyst flow (>10)."

Gross et al U.S. Pat. No. 4,448,753, which is incorporated herein by reference, is directed to a coke combustor somewhat submerged in a bubbling dense bed. The coke combustor operates conventionally, i.e., with large amounts of regenerated catalyst recycle to the coke combustor. The patent teaches how to avoid flow reversal with high catalyst recycle rates, 10 tons recycled per ton of spent catalyst—see the middle column of Table 2. Although heat transfer could theoretically occur, there is so much catalyst recycle that delta T between the coke combustor and the second dense bed will be very low, reducing the amount of heat transfer by indirect heat exchange that could occur. Such a design will usually require new construction to handle increased catalyst traffic produced by large amounts of catalyst recycle.

I wanted a way to have high efficiency regeneration of catalyst in a way that could readily be performed in an existing single dense bed regenerator, without catalyst recycle. I wanted to avoid the power consumption of conventional catalyst recycle operations. There is a lot of energy consumed in lifting tons per minute of catalyst up 10 or 20 feet into a bubbling dense bed and then dumping this catalyst back down into a coke combustor.

The recycle of large amounts of hot regenerated catalyst into the coke combustor will also increase apparent catalyst traffic in the regenerator. In general, particulates emissions are proportional to catalyst traffic, and doubling of catalyst traffic will double particulates emissions. This is not too difficult to handle in new construction, such as a new high efficiency regenerator, which operates with large amounts of catalyst recycle, and is sized, and has cyclones adapted to handle the catalyst traffic. In older units, such as bubbling dense bed regenerators, it is more difficult to modify the unit to handle increased catalyst traffic.

There has been little work done in this area. Most refiners simply recycle catalyst, and pay the cost of power consumption and increased particulates emissions. Part of the reason for this acceptance of catalyst recycle is that conventional approaches do not provide enough surface area for effective heat transfer. U.S. Pat. No. 3,923,686, filed in 1972, before the benefits of catalyst recycle were apparent to refiners, shows in FIG. 3 a somewhat immersed coke combustor is disclosed, which could be heated to a limited extent by heat transfer across a common wall shared with a bubbling dense bed regenerator.

A more effective heat transfer method was disclosed in Johnson U.S. Pat. No. 2,401,739. This teaches a multistage regenerator, where the first stage of regeneration ran hotter than the second. "In . . . my process it is preferred to maintain the initial regeneration zone 32 at a higher temperature than the final regeneration zone . . . Operating in this manner, heat is conducted from the initial regeneration zone to the final regeneration zone through the walls separating the two zones." Column 4 Lines 50-59. Johnson recognized that heat transfer could occur through regenerator vessel walls, but used this to cool the first stage of regeneration, rather than heat it. He also avoided CO combustion, and lacked a dilute phase transport riser which would have permitted safe CO combustion.

To summarize, the art has embraced high efficiency regenerator with heated coke combustors, but generally uses catalyst recycle to fire up the coke combustor. This approach works well in new construction, but not in existing units, and it also consumes a lot of horsepower for catalyst recirculation, and increases catalyst traffic in the regenerator. Some of the earliest work on coke combustors, operating without catalyst recycle, may have had modest amounts of indirect heat exchange, but based on the Figures shown, not enough to permit effective heating of a coke combustor.

I discovered a way to overcome many of the deficiencies of the prior art methods of regenerating spent FCC catalysts in a single dense bed by, in effect, immersing a two stage regenerator in the space previously occupied by a single stage regenerator. My design also permits reduction of NOx emissions from a conventional, single dense bed FCC regenerator by providing a practical way to achieve two stages of regeneration in an existing, single stage or single bed regenerator. I use the shell of the conventional single stage regenerator, and much of the equipment heretofore associated with it, to economically get two stages of regeneration in a vessel previously used to contain a single dense bed of FCC catalyst for regeneration. This approach permits the regenerator to accommodate more difficult stocks, and to tolerate somewhat higher temperatures.

BRIEF SUMMARY OF THE INVENTION

Accordingly, the present invention provides in a process for regenerating in a regenerator vessel a coke contaminated fluidized catalytic cracking catalyst by contact with an oxygen-containing regeneration gas in a coke combustor having sidewall portion and a base portion and comprising a first dense bed to produce at least partially regenerated catalyst and carbon monoxide, discharging from the coke combustor the at least partially regenerated catalyst and gas up into a contiguous dilute phase transport riser having a base connective with the coke combustor and afterburning in the transport riser carbon monoxide to $CO_2$ and discharging from the dilute phase transport riser regenerated catalyst which is collected in a second dense bed of hot regenerated catalyst and flue gas which is removed from the process, the improvement comprising heating said spent catalyst in said coke combustor without recycle of hot regenerated catalyst, by maintaining at least a portion of the sides, and essentially the entire base portion of the coke combustor immersed within, and in a heat exchange relationship with, the second dense bed of regenerated catalyst.

In another embodiment, the present invention provides a method of converting a single dense bed, FCC regenerator vessel having a diameter and comprising a spent catalyst inlet, a regenerated catalyst outlet, a combustion air inlet, and a flue gas outlet, wherein said regenerator maintains spent catalyst as a single fluidized bed within said regenerator into a high efficiency regenerator comprising a coke combustor having a first dense bed, a dilute phase transport riser, and a second dense bed for hot regenerated catalyst, said method comprising adding a closed coke combustor having a diameter, sides and a base inside said regenerator, said coke combustor having a diameter within the range of 25-75 percent of the diameter of the pre-existing regenerator and spaced from the sides and bottom of said regenerator by at least 1 foot; connecting the spent catalyst inlet to said coke combustor and connecting said regeneration gas inlet to said coke combustor; adding a vertical dilute phase transport riser, having an inlet diameter as large as said coke combustor diameter connective with said coke combustor and an outlet having a diameter having a smaller diameter, onto the top of said closed coke combustor and connective therewith; and adding, or maintaining, means to maintain the catalyst level in the pre-existing regenerator vessel at an elevation sufficient to immerse at least a majority of the sides and all of the base of the coke combustor in said second dense bed.

In an apparatus embodiment, the present invention provides an apparatus for the regeneration of fluidized catalytic cracking catalyst comprising; a regenerated catalyst vessel having walls and a base for receiving and maintaining a dense phase fluidized bed of hot, regenerated catalyst and comprising a regenerated catalyst outlet having a catalyst flow control means and catalyst level control means operative to maintain a predetermined level of regenerated catalyst in said regenerator vessel; a coke combustor, disposed within said regenerator vessel, having a spent catalyst inlet and a regeneration gas inlet, said coke combustor having a side portion and a bottom portion, and wherein said side and bottom portions are disposed within said regenerated catalyst vessel in a heat exchange relationship and said side and bottom portions are at least 1 foot from the walls and base of said regenerated catalyst vessel; and a dilute phase transport riser superimposed upon and connective with said coke combustor for receiving a dilute phase mixture of catalyst from the coke combustor and having an outlet for discharge of regenerated catalyst and flue gas within said regenerator vessel.

BRIEF DESCRIPTION OF THE DRAWINGS

FIG. 1 (Prior Art) is a simplified, cross-sectional view of a conventional, single dense bed regenerator.

FIG. 2 is a simplified, cross-sectional view of an embodiment of the invention, with a coke combustor zone within a conventional single dense bed regenerator.

DETAILED DESCRIPTION

The invention can be better understood with reference to the drawings. FIG. 1 will first be discussed, it is a typical, prior art, cross-flow type FCC regenerator.

Regenerator shell 1 contains a dense bed 50 of hot, regenerated catalyst. Spent catalyst, from an FCC reactor stripper (not shown) is passed via line 40 into bubbling dense bed 50. Combustion air is added via line 10, and distributed in a lower portion of bed 50 via air grid 25. Hot regenerated catalyst is withdrawn for reuse in the cracking process via line 30. Flue gas, with entrained catalyst, rises above bed 50 and passes through cyclone 51. Recovered catalyst is discharged back into bed 50 via dipleg 52, which is sealed by immersion in bed 50. Flue gas is discharged from the cyclone via outlet 53 to plenum 60 and flue gas exit line 70.

The process and apparatus of the present invention will now be described with reference to FIG. 2. FIG. 2 represents an existing FCC regenerator such as that shown in FIG. 1, which has been modified to practice the present invention. Elements common to both Figures have the same reference numerals, e.g., shell 1 is the same in both FIG. 1 and FIG. 2.

An internal combustion chamber or coke combustor 301 is the main modification. The internal combustion chamber receives spent catalyst from line 40 which discharges catalyst down via baffled opening 315 into the coke combustor 301 which maintains the catalyst as a relatively dense phase fluidized bed 450, but one which is much more active than the old bubbling bed 50 in the prior art design. Combustion air from line 10 is added via dome air grid 325 to begin coke combustion. The coke combustor narrows down via transition section 305 connecting the coke combustor to dilute phase transport riser 302. Regenerated catalyst is discharged from riser 302 and deflected by deflector 320 into opening 310 into the existing regenerator vessel 1. Hot regenerated catalyst collects as a second dense bed of catalyst 350 in the bottom of regenerator vessel 1. Second dense bed 350 will usually be a bubbling bed, i.e., fairly similar in regard to fluidization to the regime existing in the prior art single dense bed 50. A fluffing ring 111 is supplied with fluffing air via lines 110 to keep hot regenerated catalyst in bed 350 in an aerated state. Regenerated catalyst is withdrawn from regenerator 1 via regenerated catalyst standpipe 30 for reuse in the catalytic cracking process.

Flue gas from coke combustion, along with minor amounts of entrained catalyst and some catalyst fines, enter cyclone 51. Catalyst is recovered from flue gas and discharged via dipleg 52 back into the second dense bed. Flue gas, with a reduced solids content, is discharged overhead from the cyclone separator via outlet 53 into plenum chamber 60 and removed from the FCC unit via flue gas outlet 70.

In the embodiment shown, the coke combustor 301 is heated to some extent by immersion in the bed 350 of hot, regenerated catalyst. There is also a limited amount of preheating of spent catalyst in line 40 and a modest amount of preheating of combustion air added via line 10.

Preferably, in the embodiment shown in the figure, a CO combustion promoter is present to enhance the efficiency of coke combustion within coke combustor 301, and to augment afterburning of carbon monoxide to carbon dioxide within dilute phase transport riser 302.

To augment coke combustion, and carbon monoxide afterburning in the dilute phase transport riser, it is also contemplated to recycle some of the hot regenerated catalyst from bed 350 into the coke combustor dense bed 450 by line 31, with control of hot regenerated catalyst flow by slide valve 32 or other equivalent means, not shown. Recycle of hot regenerated catalyst in this manner will make the coke combustor hotter, promote more complete coke combustion in the coke combustor, and augment CO afterburning in the dilute phase transport riser. Very little catalyst recirculation to the coke combustor will be needed in the process and apparatus of the present invention, because of the heat exchange relationship which exists between the coke combustor and the second dense bed.

It is also possible, and will be preferred in many instances, to operate with only partial combustion of coke to $CO_2$. All of the coke deposited on the spent catalyst will be removed, but it will be burned to a mixture of carbon monoxide and carbon dioxide. This will minimize the heat release within the coke combustor, and permit processing of heavier, high coking crudes, or allow increased processing of resids.

Preferably, the unit operates as shown in FIG. 2, i.e., indirect heat exchange with, but no catalyst recycle from, the second dense bed to the coke combustor. Operation with generous amounts of CO combustion promoter, e.g., on the order of 1-10 ppm wt. will ensure rapid and complete coke combustion within the coke combustor, and relatively complete CO combustion in dilute phase transport riser 302.

It is also possible to have some additional combustion of residual carbon remaining on regenerated catalyst in the second dense bed region 350. This catalyst will be extremely hot, platinum CO combustion promoter will preferably be present as part of the catalyst inventory, so any coke combustion that occurs here will be fairly complete to $CO_2$, provided enough fluffing air is present. Normally the catalyst exiting riser outlet 310 will have a very low carbon level, on the order of 0.05 wt. % carbon or less.

Where the shell of the regenerator can not tolerate the very high temperatures associated with complete CO combustion, the present invention allows the highest temperatures to be confined to the coke combustor and the transport riser, especially to the transport riser outlet. A heat exchange means, such as a coil or heat exchanger tubes, not shown, can be used to remove heat from second dense bed 350, and achieve complete CO combustion without having much of the metallurgy of the regenerator vessel exposed to the high temperatures associated with complete CO combustion.

The FIG. 2 embodiment works especially well when combined with a hot stripper, not shown. In a hot stripper, spent catalyst is mixed with some hot regenerated catalyst to heat the spent catalyst. Hotter stripping is better stripping, and removes more strippable materials from the spent catalyst. This reduces the burning load in the regenerator, and also provides hotter spent catalyst for use in the regenerator. Hot catalyst strippers are known in the art, and a suitable design is shown in U.S. Pat. No. 4,820,404 (Owen), which is incorporated herein by reference.

Preferred operating conditions in each section of the regenerator of the present invention will now be discussed.

COKE COMBUSTOR CONDITIONS

The spent catalyst temperature will usually be in the range of 900 to 1100 F, preferably 925 to 1050 F. In the coke combustor, as represented by dense bed of catalyst 450, the regeneration conditions include a certain amount of air preheat, typically to about 350 F. The temperature of the catalyst at the regenerator inlet in a typical unit will be about 960 F. The catalyst particle density will typically be about 90 lbs/ft$^3$, and the average particle diameter will be about 64 microns.

The carbon on spent catalyst will typically be around 0.8 wt %, and the hydrogen on coke will be about 8.5 %.

The superficial gas velocity at the top of the fast fluidized bed will preferably be about 3.5 feet/second, while the superficial gas velocity in the dilute phase transport riser will be about 10.5 feet/second.

Preferably, intense fluidization is achieved by designing the internal chamber so the dense bed of catalyst 350 is maintained as a fast fluidized bed. Such beds are characterized by very small "bubbles" or voids. The bed will be relatively low in density, as compared to the density of the conventional dense phase fluidized beds used in single stage regenerators.

2ND DENSE BED

Conditions in the second dense bed of regenerated catalyst, bed 350 in the FIG. 2 embodiment will typically include a dense bed temperature of around 1300 F, for the spent catalyst and regeneration conditions used in the coke combustor as described above. The bed density will be about 35 lbs/ft$^3$. The second dense bed will be fluidized with air, but only about 1.0% of the combustion air will be added to the second dense bed, primarily for fluffing, and to maintain the bed active so that efficient heat exchange with the coke combustor can be achieved. These conditions will reduce the carbon on regenerated catalyst to around 0.05 wt %.

Great latitude in operating conditions in the coke combustor, transport riser, and second dense bed can be tolerated and will be beneficial in different circumstances. When extremely heavy feeds are being processed, the carbon on regenerated catalyst may be higher. Local conditions may make it advisable to operate with higher or lower vapor velocities in a region.

HEAT TRANSFER

The most important element of better heat transfer is geometry, i.e., having the bottom and sides of the coke combustor immersed in and in a heat exchange relationship with the second fluidized bed holding regenerated catalyst. Sufficient heat transfer can be obtained for many units merely by relying on heat transfer through the conventional vessel walls of the coke combustor. Several steps can be taken to improve heat transfer further.

A conductive refractory, or use of more steel and less or no refractory will improve heat transfer.

A dimpled or rippled or ridged surface can be applied to the inner, or outer, or both walls of the coke combustor vessel to increase surface area. Conventional heat exchange fins can be used to increase surface area.

Heat pipe are another effective means of increasing heat transfer from the bubbling or second fluidized bed to the coke combustor.

Heat pipes are a mechanical apparatus well known in the heat transfer arts. They comprise an outer sealed cylindrical conduit which retains a small amount of working fluid which may be vaporized and condensed at the temperatures of the heat source and heat sink, respectively. The working fluid is vaporized in the bubbling dense bed of the catalyst regenerator and condensed in the coke combustor. A wick is provided to transfer the condensed fluid from the fast fluidized bed coke combustor side back to the bubbling dense bed side of the regenerator.

Heat pipes work best when vertical, which means they are especially well suited for use in heating a coke combustor immersed in, but above the base of, a bubbling dense bed catalyst regenerator.

Heat pipes have heretofore been proposed for use in removing heat from FCC regenerators, by transferring the heat to boil water and make steam, and heat pipes of similar design may be used herein. The heat pipes should be made of metals which can withstand the harsh erosive environment within FCC regenerators and strippers, so use of heavy gage materials, such as thick stainless steel for the pipes is preferred. Standard references describe working fluids which are suitable, and conventional high temperature working fluids such as sodium, potassium, cesium or mercury can be considered for use herein. Because of the possibility of a tube rupture, a working fluid should be selected which will do the least amount of damage to the FCC catalyst inventory. Sodium is a poison of sorts for FCC catalyst, but a well known one, which can be tolerated in relatively large amounts, so this may be a preferred working fluid.

For reasons of ease of fabrication and installation, and erosion resistance, it will usually be preferred to operate with heat pipes having on outer diameter of one to five inches, and a length of 5 to 10 feet. The heat pipes may be used in bundles or clumps or evenly distributed about or under the coke combustor.

More details on the use of heat pipes to remove heat from FCC regenerators are disclosed in U.S. Pat. No. 4,595,567, which is incorporated herein by reference.

Preferably the spent catalyst is heated at least about 20 F by indirect heat exchange in the coke combustor, and most preferably at least 30 F. Ideally, the spent catalyst in the coke combustor is heated more than 40 F, e.g., with 50 to 100 F of heating.

Usually the bubbling dense bed of catalyst will be spaced from the sidewalls and the bottom of the coke combustor by at least 1 foot, to allow adequate catalyst circulation, and preferably by a least 2 feet, and most preferably by 2.5 to 5 feet.

ILLUSTRATIVE EMBODIMENT

The following illustrative embodiment is based on calculations and estimates, not experiments. The numbers reported are believed reasonable estimates of what may be achieved in practice.

I estimated the amount of indirect heat transfer that would occur in a partially immersed coke combustor of the prior art. The basis was the amount of indirect heat transfer that could occur if catalyst recycle were eliminated from the design shown in Gross et al U.S. Pat. No. 4,448,753. This represents quite a distortion of the intent and operation of '753, because with the extremely high catalyst recycle rates shown in the patent there would be very little delta T to cause heat exchange, and no need for indirect heat exchange because of the large amount of direct contact heating, but nonetheless provides a starting point for analysis.

Assuming the vessel shown in '753 was 40 Ft, tangent to tangent, and 40 Ft in diameter, and than the annular space for catalyst was about 2 ft, the immersed section would be about 15' high and 19' in diameter. The circumference of the coke combustor would be 59.69', and the area would be 895.35 ft$^2$.

The surface area of the bottom portion of this vessel, which is not immersed, would be equal to about 37.5 % of the total surface area of the '753 coke combustor.

In my design, with a vessel having a 40' height, tangent to tangent, and a 20' lower, conical section, containing a coke combustor comprising a cylindrical vessel of 4' in height, having a conical base and displaced in from the sides of the regenerator vessel by 2' on the side and at the base, I calculate the following. The cylindrical portion of my coke combustor has a surface area of 4'* 36 '* Pi, or 452.39 ft$^2$. The conical base portion, which is completely wetted in my design, has the area of a cone with the diameter at the widest portion of the cone equal to 36', and a 4' diameter at the base or narrow portion of the cone. The height of the cone is 20', and the side angle is 27°. The height of the cone is 20', and the side angle is 27°. The area is 1696 ft$^2$. The total area available for heat transfer is:

| | |
|---|---|
| 452 | (cylindrical section) |
| + 1696 | (cone base section) |
| 2148 | ("wetted" surface of the coke combustor) |

I estimate that the heat transfer coefficient across conventional vessel walls will be about 100 BTU/hr-ft$^2$-°F-ft. The heat transfer coefficient will be the same per given unit of surface area, that is, it will not change significantly between my design and the design shown in '753. In this simple calculation, my design transfers more heat because there is more surface area for heat transfer, not because of any change in heat transfer coefficient. Assuming a 1000 F coke combustor (which means the spent catalyst comes in at, or is heated to, 1000 F), and assuming a bubbling dense bed temperature of 1300 F, the amount of heat transferred by each design can be calculated from the surface area * dT * U. My design will transfer 64 * 10$^6$ BTU/Hr, will the design shown in '753 will only provide 26.5 * 10$^6$ BTU/Hr. This shows that a change in shape, which provides more wetted surface area available for heat transfer, will provide a significant increase in heat transfer.

For a unit of this size, a typical catalyst circulation would be around 40 tons/minute, and in many units this will result in 40 lbs/hr of catalyst emissions. By relying on indirect heat exchange, rather than operating with a 3:1 catalyst recycle rate to the coke combustor (which is where most of them operate) my unit will have only 40 lbs/hr of catalyst emissions, while the same unit operating with 3 times the catalyst traffic (as by recycling 3 weights of regenerated catalyst to the coke combustor for every unit of spent) will have about 3 to 4 times as much, e.g., 120 to 160 lbs/hr of catalyst emissions.

Provision of heat pipes, or fins can also be used to further improve heat transfer. I prefer to operate with conventional vessel walls, perhaps lined with conductive refractory materials, because of the harsh erosive environment in an FCC regenerator.

I claim:

1. In a process for regenerating in a regenerator vessel a coke contaminated fluidized catalytic cracking catalyst by contact with an oxygen-containing regeneration gas in a coke combustor having sidewall portion and a base portion and comprising a first dense bed to produce at least partially regenerated catalyst and carbon monoxide, discharging from the coke combustor the at least partially regenerated catalyst and gas up into a contiguous dilute phase transport riser having a base connective with the coke combustor and afterburning in the transport riser carbon monoxide to $CO_2$ and discharging from the dilute phase transport riser regenerated catalyst which is collected in a second dense bed of hot regenerated catalyst and flue gas which is removed from the process, the improvement comprising heating said spent catalyst in said coke combustor without recycle of hot regenerated catalyst, by maintaining at least a portion of the sides, and essentially the entire base portion of the coke combustor immersed within, and in a heat exchange relationship with, the second dense bed of regenerated catalyst, and wherein at least a portion of the regeneration gas added to the coke combustor is added via an inlet line which passes through, and is in a heat exchange relationship with, the second dense bed of hot regenerated catalyst and wherein the coke contaminated catalyst added to the coke combustor is added via a catalyst inlet line which is at least partially immersed in, and in a heat exchange relationship with, the second dense bed of hot regenerated catalyst.

2. The process of claim 1 wherein at least about a one foot thickness of hot regenerated catalyst is maintained as a fluidized bed beneath said base portion of said coke combustor.

3. The process of claim 1 wherein CO combustion promoter is present to ensure substantially complete combustion of carbon monoxide to $CO_2$ within the dilute phase transport riser.

4. The process of claim 1 wherein the circulating catalyst inventory contains 0.1 to 100 wt. ppm of a CO combustion promoter selected from the group of platinum, palladium, iridium, osmium, rhodium, ruthenium, rhenium and compounds and mixtures thereof.

5. The process of claim 1 wherein the circulating catalyst inventory contains CO combustion promoter in an amount equivalent to 1-10 wt. ppm platinum.

6. The process of claim 1 wherein the coke combustor has cylindrical sidewalls and is radially aligned with the renegerator vessel and said second dense bed of hot regenerated catalyst is maintained as an annulus about the coke combustor.

7. The process of claim 6 wherein the coke combustor and at least the base of the transport riser are immersed within said second dense bed.

8. The process of claim 1 wherein a fluffing air supply is connective with said second dense bed.

* * * * *